(12) United States Patent
Bestermann et al.

(10) Patent No.: US 11,064,354 B2
(45) Date of Patent: Jul. 13, 2021

(54) VIRTUAL TENANT FOR MULTIPLE DWELLING UNIT

(71) Applicant: ARRIS Enterprises LLC, Suwanee, GA (US)

(72) Inventors: John Randolph Bestermann, Suwanee, GA (US); James Brook Longdon, Bothell, WA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/903,120

(22) Filed: Feb. 23, 2018

(65) Prior Publication Data

US 2019/0268762 A1  Aug. 29, 2019

(51) Int. Cl.
| | |
|---|---|
| *H04W 12/02* | (2009.01) |
| *H04L 29/12* | (2006.01) |
| *H04W 12/08* | (2021.01) |
| *H04L 29/06* | (2006.01) |
| *H04W 12/06* | (2021.01) |
| *H04L 12/46* | (2006.01) |
| *H04L 12/24* | (2006.01) |

(Continued)

(52) U.S. Cl.
CPC ......... *H04W 12/02* (2013.01); *H04L 12/4641* (2013.01); *H04L 41/5054* (2013.01); *H04L 61/1541* (2013.01); *H04L 61/2539* (2013.01); *H04L 63/0272* (2013.01); *H04L 63/0892* (2013.01); *H04L 63/104* (2013.01); *H04W 12/06* (2013.01); *H04W 12/08* (2013.01); *H04L 41/5077* (2013.01); *H04W 84/12* (2013.01); *H04W 92/02* (2013.01)

(58) Field of Classification Search
CPC ..... H04W 12/02; H04W 12/08; H04W 84/12; H04W 92/02; H04L 61/1541; H04L 61/2539

See application file for complete search history.

(56) References Cited

U.S. PATENT DOCUMENTS

| | | | |
|---|---|---|---|
| 8,412,942 | B2 | 4/2013 | Bestermann |
| 9,025,533 | B1 | 5/2015 | Lok et al. |
| 9,288,645 | B1 | 3/2016 | Chen et al. |

(Continued)

OTHER PUBLICATIONS

Cisco, 'MAC Authentication Bypass Deployment Guide', Document ID 1518931531672238, May 13, 2011, pp. 1-19. (Year: 2011).*

(Continued)

*Primary Examiner* — Melvin C Marcelo
(74) *Attorney, Agent, or Firm* — Buchanan, Ingersoll & Rooney PC (57) ABSTRACT

An apparatus and method provide personal networks to tenants on a multiple dwelling unit (MDU) network. Virtual Local Area Networks (VLANs) are assigned to a plurality of tenants to define a plurality of personal networks on the MDU network such that each of the personal networks is for a different tenant and is assigned a different VLAN. Onboarding requests are received from a plurality of client devices of a tenant for access to a personal network assigned to the tenant such that, when provisioned onto the personal network, intercommunication between the client devices of the tenant across the MDU network within the personal network is provided while access thereto by client devices of other tenants is blocked.

18 Claims, 5 Drawing Sheets

(51) Int. Cl.
*H04W 92/02* (2009.01)
*H04W 84/12* (2009.01)

(56) References Cited

U.S. PATENT DOCUMENTS

| | | |
|---|---|---|
| 9,386,482 B1 | 7/2016 | Chen et al. |
| 9,467,831 B2 | 10/2016 | Chen et al. |
| 9,674,186 B2 | 6/2017 | Bestermann et al. |
| 2002/0145506 A1 | 10/2002 | Sato |
| 2013/0201978 A1* | 8/2013 | Iyer .................. H04W 84/12 370/338 |
| 2014/0192794 A1 | 7/2014 | Montemurro et al. |
| 2018/0041943 A1* | 2/2018 | Visuri ............... H04M 15/8351 |
| 2018/0316563 A1* | 11/2018 | Kumar ............... H04L 41/0893 |

OTHER PUBLICATIONS

PCT International Search Report & Written Opinion, RE: Application No. PCT/US2019/017732, dated Apr. 15, 2019.

* cited by examiner

VIRTUAL TENANT FOR MULTIPLE DWELLING UNIT

BACKGROUND

Infrastructure for a WiFi, wireless and/or wired network may be owned and/or managed by a given entity or entities such that the given entity or entities may make the network available for use by multiple other unrelated entities. Examples of such networks may be networks provided within hotels, apartment complexes, dormitory buildings, campuses, and other institutions hereinafter referred to as multiple dwelling unit (MDU) properties.

Accordingly, various electronic devices of the unrelated entities, such as computers, lap tops, tablets, smartphones, printers, gaming devices, televisions, customer premises equipment, gateways, cable boxes, and the like of residents, students, or the like, hereinafter referred to as tenants, may be configured to connect to the MDU network via wireless communications or communications over wire connections to the network, for instance, to enable Internet connectivity. For purposes of privacy, each device connecting to the shared MDU network is necessarily blocked from seeing the other devices on the network. Thus, it is not possible for one device connected to the MDU network to communicate, share, pull, transfer, or perform any other task with another device also connected to the MDU network solely and directly by way of the network itself. This is true even if the devices are commonly owned by the same entity.

By way of simple example, a school may offer a MDU network to students for wireless and/or wired connections to the network, for instance, for purposes of connecting to the Internet or other source of information. An individual student may have multiple devices connected to the MDU network, such as a laptop computer and a wireless printer. Unfortunately, the printer would not be visible to the laptop, and thus, the student could not send a file for printing to his/her printer directly by way of the MDU network. Of course, if the student's printer was made visible to the student's laptop over the MDU network, then the student would be able to communicate from the laptop to the printer. However, in this scenario, the student's laptop would also necessarily be able to see all other student's devices and printers connected to the shared network, which is not desired from a privacy standpoint across an MDU network being accessed by multiple unrelated tenants.

SUMMARY

Thus, according to an embodiment, a method of providing personal networks to tenants on a multiple dwelling unit (MDU) network is provided. The method includes assigning unique Virtual Local Area Networks (VLANs) to a plurality of tenants to define a plurality of personal networks on the MDU network such that each of the personal networks is reserved for a different tenant and is assigned a different VLAN. The method also includes receiving onboarding requests from a plurality of client devices of a tenant for access to a personal network assigned to the tenant such that, when provisioned onto the personal network, intercommunication between the client devices across the MDU network within the personal network is provided.

According to another embodiment, apparatus for providing personal networks to tenants on a multiple dwelling unit (MDU) network includes a MDU manager configured to assign a unique Virtual Local Area Networks (VLAN) to each newly added tenant to thereby define personal networks on the MDU network that are each only accessible by client devices of tenants to which the personal networks are assigned in a manner permitting intercommunication of client devices of a tenant across the MDU network within the personal network of the tenant According to another embodiment, a non-transitory computer-readable storage medium comprising stored instructions which, when executed by one or more computer processors, cause the one or more computer processors to perform steps of assigning unique Virtual Local Area Networks (VLANs) to a plurality of tenants to define a plurality of personal networks on the MDU network such that each of the personal networks is for a different tenant and is assigned a different VLAN, and receiving onboarding requests from a plurality of client devices for one of the personal networks assigned to one of the tenants in a manner permitting intercommunication of the client devices across the MDU network within the personal network to which no other tenant has access.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a separate virtual network may be provided to each entity or individual across a wired and/or wireless MDU network on a MDU property having a managed WiFi infrastructure which is otherwise shared by multiple unrelated entities or individuals across the property. For instance, according to this embodiment, a managed network provided in an otherwise large-scale will appear to each individual user or tenant on the MDU property as a private or personal network such as provided in a routed single-family home, private premises, or the like.

According to an embodiment, the WiFi infrastructure uses a single Service Set Identifier (SSID) across the property or multiple Service Set Identifiers (SSIDs). A SSID is the name assigned to the managed WiFi (wireless) network and provides an IP address for the network. All devices in the network must use this case-sensitive name, typically a text string up to 32 bytes long, to communicate over the WiFi infrastructure. Thus, the client devices of each tenant of the MDU property necessarily uses the same one or more SSIDs. It is possible that the MDU property may use an additional SSID for guests of the premises or that a resident on the property has their own private network via their own private infrastructure.

According to an embodiment, each tenant on the MDU property may be provided with a "Personal Network" (PN) to which their wired and wireless devices, and only their wired and wireless devices, can intercommunicate throughout the MDU property independent of physical connection or network access point. Thus, for instance, a tenant may have multiple devices that connect to the MDU network and that are able to see and intercommunicate with each other. For instance, a laptop of the tenant connected to the Personal Network (PN) should be able to see his/her printer connected to the Personal Network (PN) and send a file to the printer over the MDU network for printing. However, according to the embodiment, the devices and Personal Network of the tenant are hidden and private relative to all other tenants on the property that may use the shared MDU network. In addition, the tenant can connect to his/her other devices and gain access to his/her Personal Network anywhere on the defined MDU property at any access or connection point or infrastructure.

Figure 1:
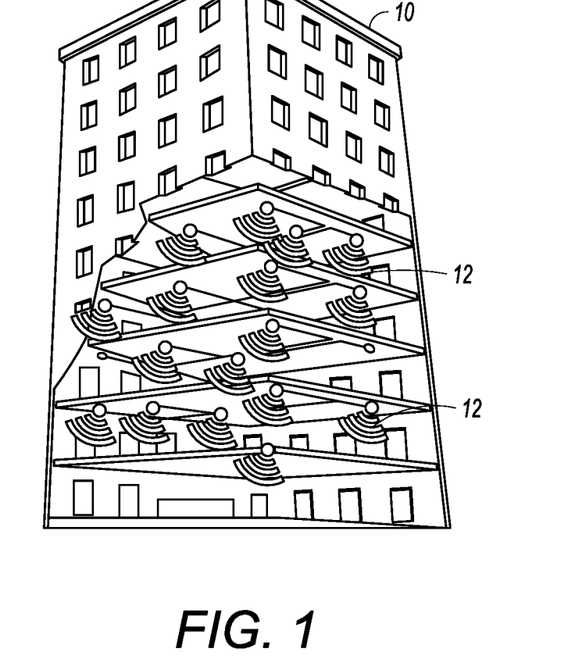
FIG. 1 is a schematic view of a MDU property having MDU network infrastructure in accordance to an embodiment.
Figure 2:
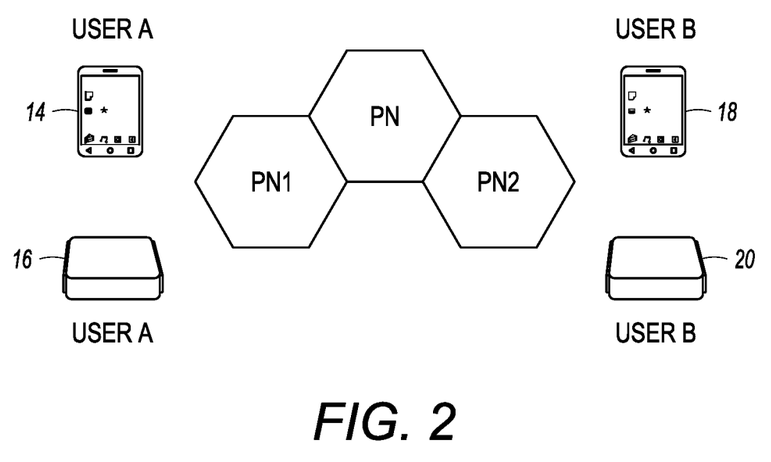
FIG. 2 is a schematic view of client devices of two tenants of a MDU property and Personal Networks thereof in accordance to an embodiment.

FIG. 1 illustrates a multiple dwelling unit (MDU) property 10, such as an apartment building, and numerous access or connection points 12 located throughout the MDU property 10 and forming part of a managed WiFi infrastructure. FIG. 2 shows two electronic devices, 14 and 16, of a "User A" and two electronic devices, 18 and 20, of a "User B". "User A" is assigned one of the Personal Networks (PN1) shown schematically in FIG. 2 and "User B" is assigned a different one of the Personal Networks (PN2) shown schematically in FIG. 2. Thus, the devices 14 and 16 can see and communicate with each other on PN1 and are isolated and hidden from the devices 18 and 20.

According to an embodiment, the Personal Networks are provided using the IEEE 802.1x dynamic VLAN (Virtual Local Area Network) assignment feature provided by equipment configuring the infrastructure, such as switching routers (ISRs), with MAC (Media Access Control) authorization bypass to dynamically create a Personal Network for a tenant that may be accessed across the MDU property via any access point. MAC Authentication Bypass (MAB) is an access control technique which uses the MAC address of a device to determine the extent of network access to provide to the device. Accordingly, a tenant registers his/her devices which are assigned to a unique VLAN thereby providing a Personal Network to the tenant and his/her devices. Thus, a known tenant or user connects to the SSID, and 802.1x MAB authentication permits boarding of the device of the tenant on the assigned VLAN.

Figure 3:
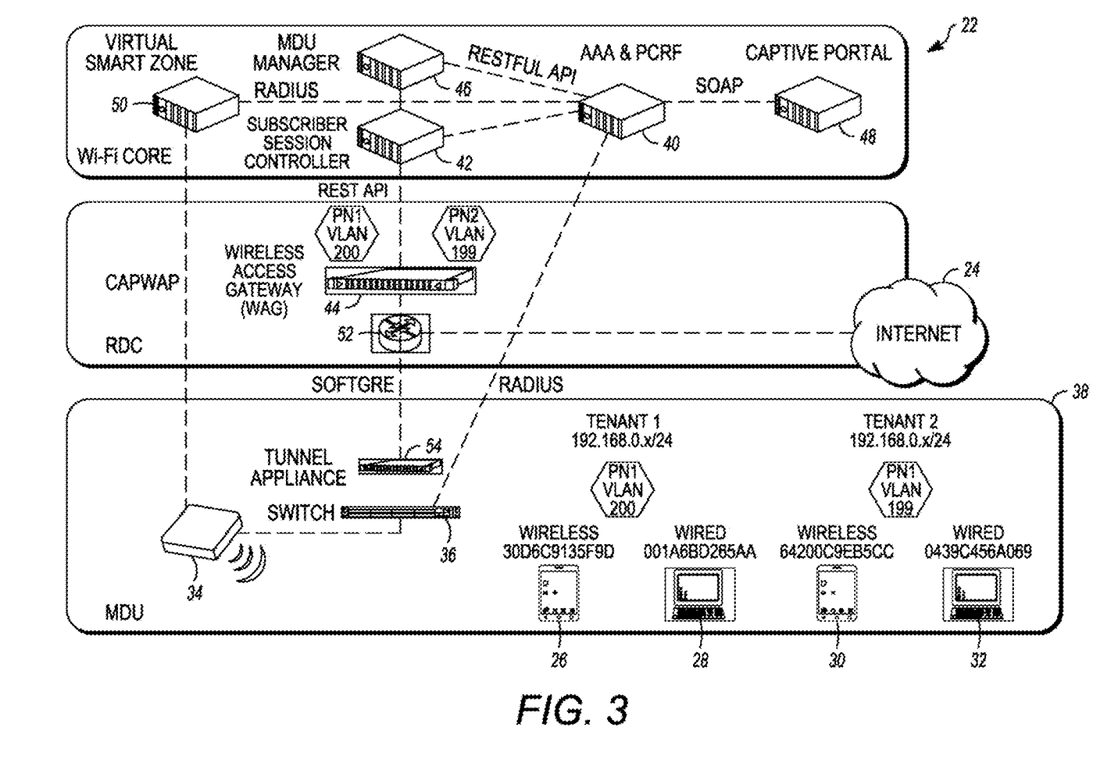
FIG. 3 is a schematic view of system architecture of infrastructure of a MDU property in accordance to an embodiment.

FIG. 3 shows a schematic view of system architecture 22 which provides different VLANs to different tenants and enables the tenants to access the Internet 24 or another network or source. In this example, Tenant 1 has two electronic devices, 26 (a wireless device) and 28 (a wired device), assigned a Personal Network (PN1), i.e., VLAN 200 on SSID 192.1680x/24, and Tenant 2 has two electronic devices, 30 (a wireless device) and 32 (a wired device), assigned a Personal Network (PN2), i.e., VLAN 199 on SSID 192.1680x/24. These devices may connect to a Personal Network on the MDU network via wireless or wired connections. For example, the devices may connect to a Personal network via the access point 34 of the managed infrastructure and associated switch 36, located on the multiple dwelling unit (MDU) property 38.

During MDU network creation for a MDU property, a captive portal and property ID are created by the AAA (Authentication, Authorization, and Accounting), and/or PCRF (Policy Control Management) unit 40 and a Captive Portal 48 for the MDU property 38. In the Subscriber Session Controller (SSC) 42 and Wireless Access Gateway (WAG) infrastructure 44 including tunnel appliances 54, a relationship is created that builds the property ID. As discussed below in greater detail, a MDU Manager 46 programmatically provisions the SSC 42 using restful API (Application Program Interface) that uses HTTP requests to get, put, post or delete data. The MDU Manager 46 is also be utilized to assign VLANs/Personal Networks to the tenants.

The WiFi controller 50 communicates with the access points 34 via Control and Provisioning of Wireless Access Points (CAPWAP), and Remote Authentication Dial-In User Service (RADIUS) may be utilized by the AAA unit 40. RADIUS is a networking protocol that provides centralized Authentication, Authorization, and Accounting management for users who connect and use a network service. A router 52 provides a connection from the MDU network to the Internet 24 or another network or source.

During individual tenant account creation according to an embodiment, a VLAN is assigned to a tenant's account via the MDU Manager 46. The tenant's account may be keyed to an email address, username, or the like. The tenant's devices are on-boarded to the tenant's account via a tenant portal for use by the tenant or the MDU Manager 46. Thus, when a client device has been added to an existing tenant's account, the WiFi infrastructure will automatically provide access to the tenant's Personal Network and other devices registered in the tenant's account.

In contrast, when an unknown client device attempts to connect to the MDU network via the infrastructure, the unknown device is assigned to a specific onboarding VLAN by the MDU Manager 46. On the onboarding VLAN, the unknown device will be redirected to an appropriate tenant portal for account creation and/or device onboarding. After onboarding, the registered device is moved to the VLAN assigned to the tenant.

According to an embodiment, dynamic VLAN assignment is accomplished via the MDU Manager 46 which provides the function of managing and reserving VLANs and assignments thereof on the MDU property. The AAA & PCRF unit 40 will request a VLAN for a tenant from the MDU Manager 46, and the MDU Manager 46 will mark the VLAN assigned as used and associated with the tenant master account. The MDU Manager 46 will also free VLANs when a tenant account is deleted.

Figure 4:
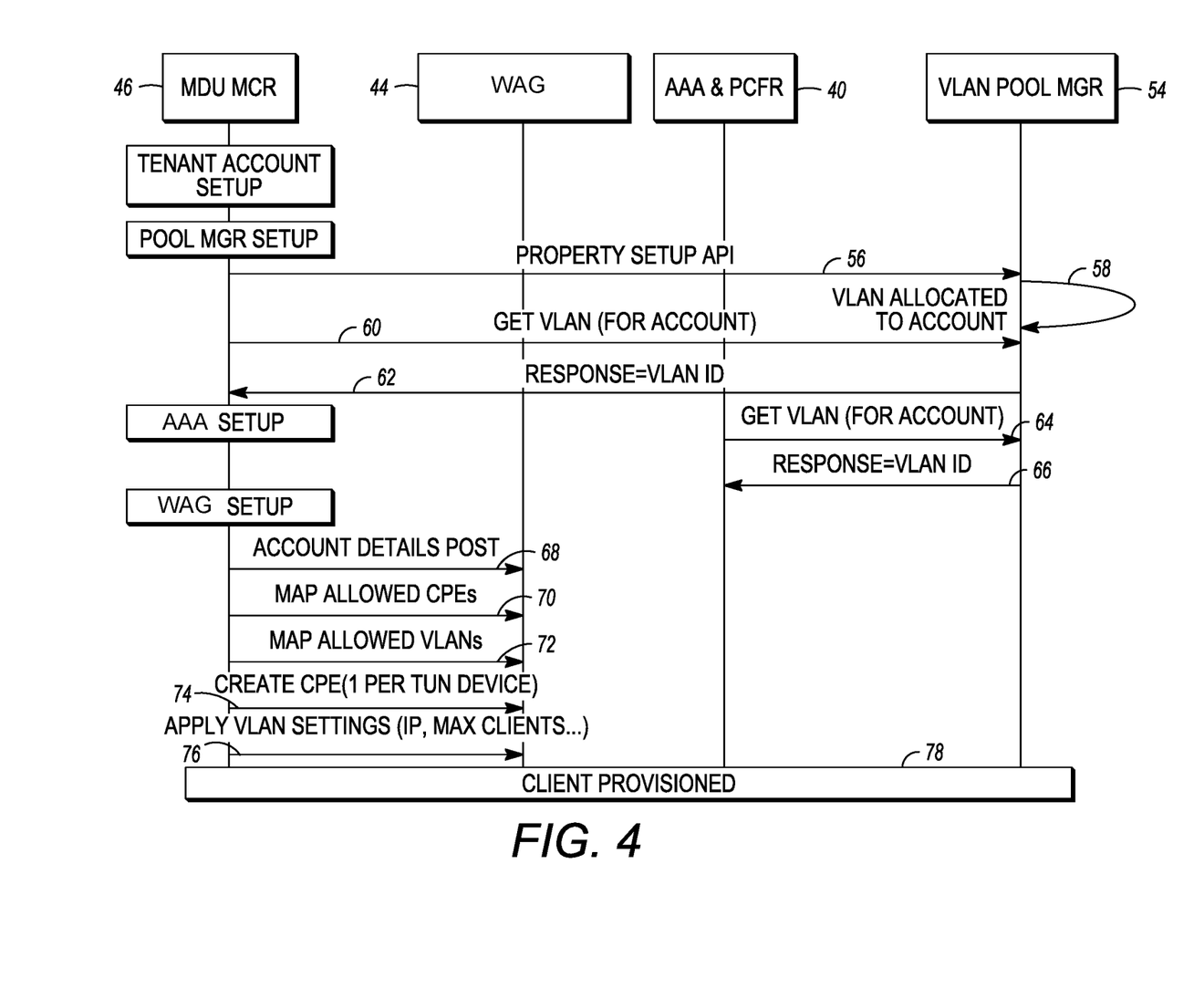
FIG. 4 is a provisioning and VLAN management call flow diagram in accordance to an embodiment.

By way of Example, a call flow diagram is shown in FIG. 4 relative to provisioning and VLAN management. The tenant account is set up in the MDU Manager 46. A VLAN Pool Manager 54 is notified of a potential new customer in step 56 via a property setup API from the MDU Manager 46, and the VLAN Pool Manager 54 allocates an available VLAN to the account (step 58). The MDU Manager 46 issues a get command for the allocated VLAN (step 60), and the VLAN Pool Manager 54 responds with the VLAN ID (step 62). The AAA unit 40 acquires the VLAN ID from the VLAN Pool Manager 54 upon first connection of the tenant (steps 64 and 66). Thereafter, the WAG 44 is provisioned.

Account details, MAP allowed CPEs, MAP allowed VLANs, CPE creation (1 per Tunnel device) and VLAN settings application (IP, max clients, etc.) communications are sent (see steps 68, 70, 72, 74 and 76) from the MDU Manager 46 to the WAG 44. As a result, the client is provisioned on the network (step 78).

Figure 5:
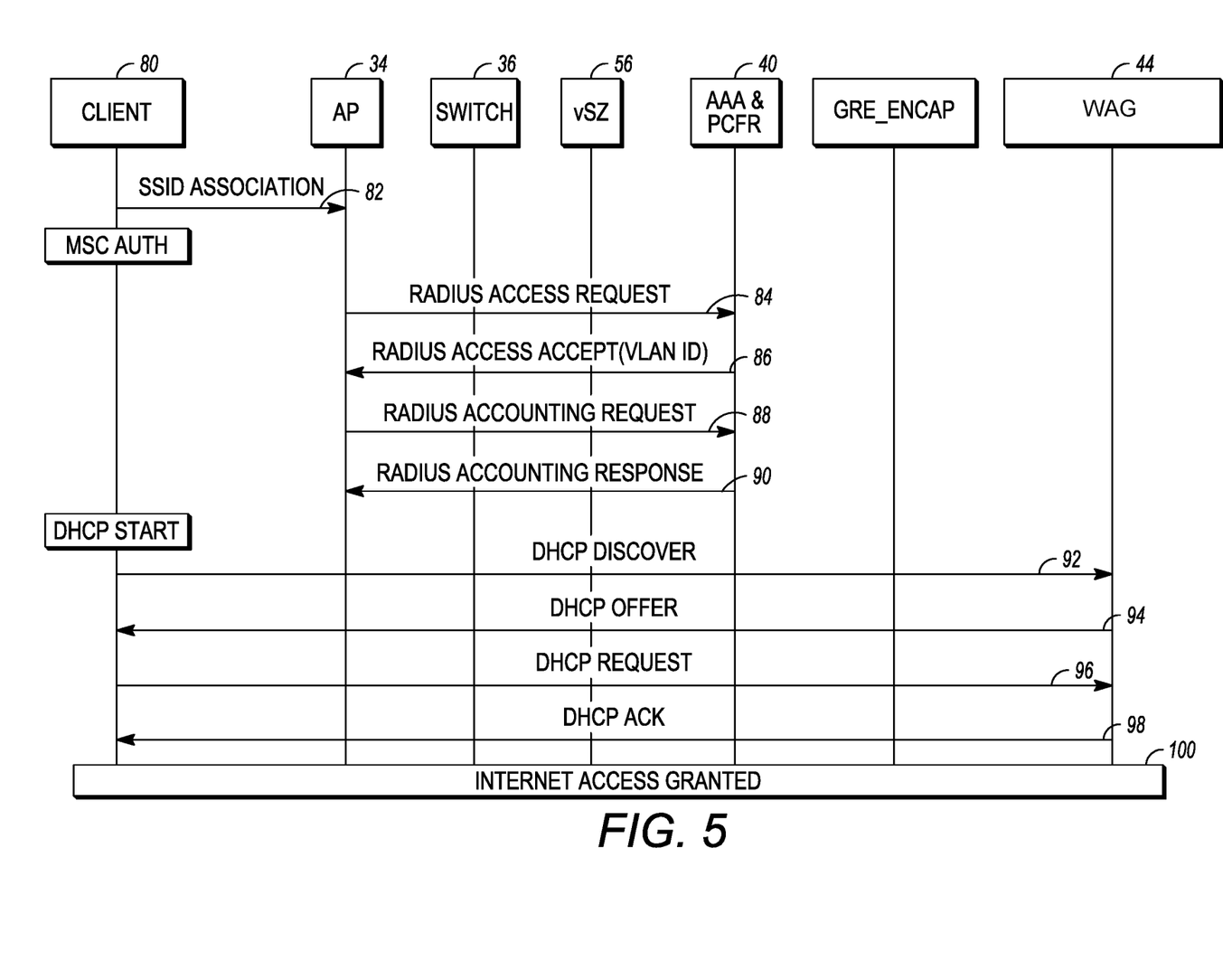
FIG. 5 is a call flow diagram for onboarding known user devices via an access point in accordance to an embodiment.

FIG. 5 shows an example of a call flow diagram relative to onboarding a known user via an access point 34. The user or tenant connects a device 80 to the access point (AP) 34 via SSID association (step 82). The AP 34 sends a MAB request to the AAA unit 40 (steps 84, 86, 88 and 90). The client device 80 gains Internet Access 100 over the MDU network by sending a Dynamic Host Configuration Protocol (DHCP) discover communication (step 92), receiving a DHCP offer (step 94) from WAG 44, requesting DHCP (step 96) from WAG 44, and receiving a DHCP acknowledgement (step 98) from the WAG 44.

Figure 6:
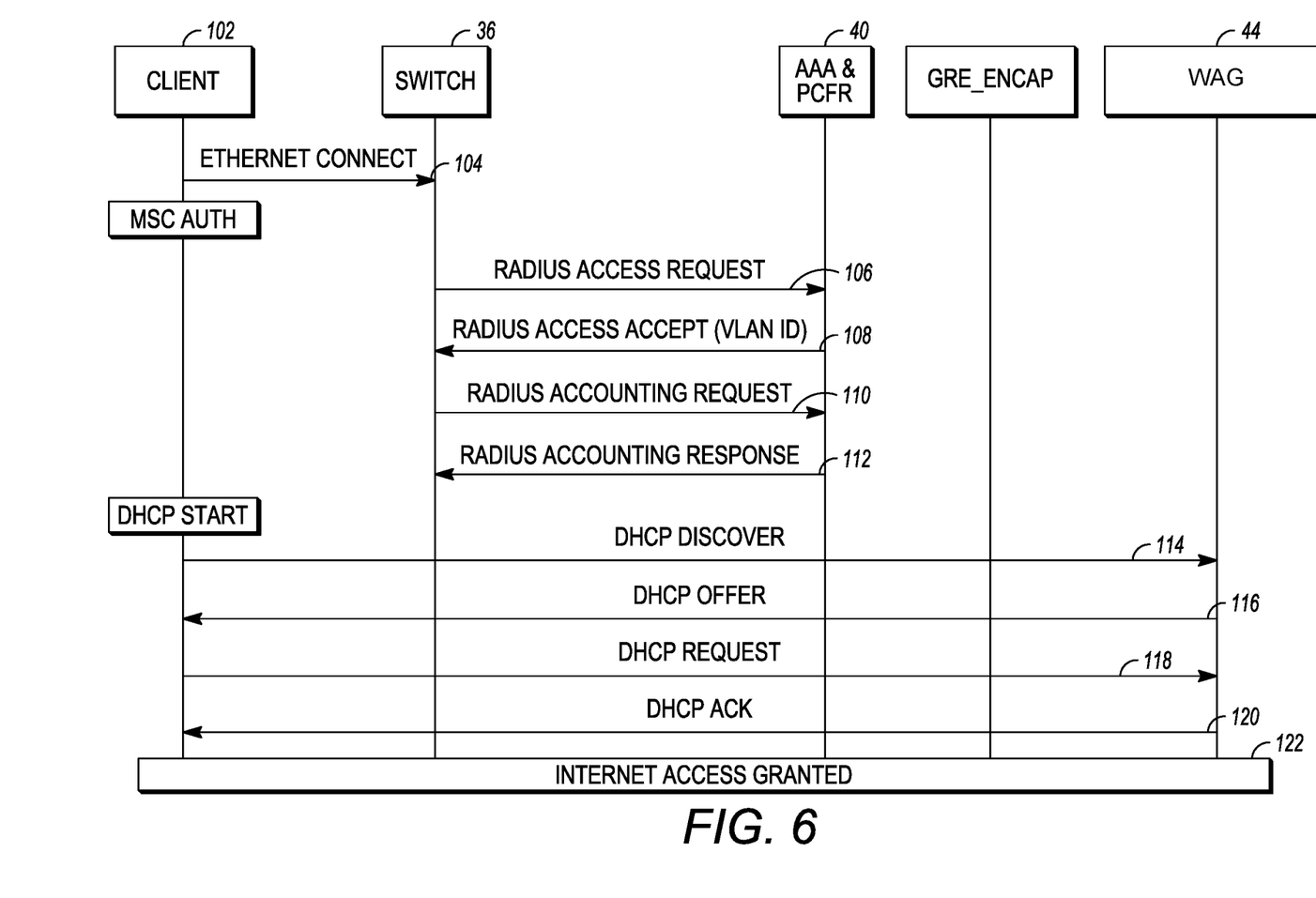
FIG. 6 is a call flow diagram for onboarding known user devices via a switch in accordance to an embodiment.

FIG. 6 shows an example of a call flow diagram relative to onboarding a known user (client device) wired to switch 36 via an ethernet connection. Here, the user connects a client device 102 to the switch 36 via an ethernet connection (step 104), and the switch 36 sends a MAB request to the AAA unit 40 (step 106). The AAA unit 40 returns an assigned tenant VLAN to the switch 36 (step 108). The switch 36 then communicates a master accounting request to the AAA unit 40 (step 110) which returns a master accounting response to the switch 36 (step 112). Thereafter, the client device 102 gains Internet Access 122 over the network by sending a Dynamic Host Configuration Protocol (DHCP) discover communication (step 114), receiving a DHCP offer (step 116) from WAG 44, requesting DHCP (step 118) from WAG 44, and receiving a DHCP acknowledgement (step 120) from the WAG 44.

A user or tenant may register or onboard a device to their account by accessing a portal webpage or the like that automatically appears on the screen of a device when an unauthenticated device attempts to connect to the MDU network. The user must already have an account or must create a new account to onboard a new device and therefore will be able to access the Internet or other devices connected to their Personal Network. The portal may request the users email address or other username in combination with an associated password or the like. The portal is configured to collect and verify new user information and may be configured to send a welcome email or other communication to the tenant. The user may use the portal to add and delete client devices, modify account information, change a password, or the like. When adding a new device, a description of the device and a MAC address of the device is required. This may be entered manually or may be detected automatically via DHCP or the like. The user may also use the portal to track client device usage statistics or the like.

A management portal may be provided to a property manager or owner. For instance, the management portal may be for use by an individual that is responsible for assisting tenants to access the MDU network (i.e., add users, delete users, reset user password, onboard or remove user devices). The management portal may also enable the manager to send email messages to one or all tenants. Session management may also be provided to enable a property manager to see all active and inactive sessions on the property and to remove any sessions. In addition, the management portal may be used to track, collect, and/or report network and/or infrastructure usage statistics.

A system for carrying out any of the above disclosed methods or arrangements may include software or the like provided on a circuit board or within another electronic device and can include various processors, microprocessors, modules, units, components, controllers, managers, chips, storage drives, and the like. It will be apparent to one of ordinary skill in the art that systems, modules, components, units, managers, processors, servers, and the like may be implemented as electronic components, software, hardware or a combination of hardware and software for purposes of providing a system and may be provided by a cloud-based system.

Embodiments may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented and are presented to illustrate the flexibility and advantages of particular embodiments as defined by the following claims and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

We claim:

1. A method of providing personal networks to tenants on a multiple dwelling unit (MDU) network, the MDU network having a captive portal and a property identification (ID), the property ID is a relationship between a subscriber session controller (SSC) and a wireless access gateway (WAG) infrastructure, the WAG infrastructure including tunnel appliances, the SSC being provisioned using restful API, comprising the steps of:

assigning Virtual Local Area Networks (VLANs) to a plurality of tenants to define a plurality of personal networks on the MDU network such that each of the personal networks is assigned to a different one of the tenants and each of the personal networks is assigned a different VLAN, wherein the VLANs are assigned to the plurality of tenants using dynamic VLAN assignment with Media Access Control (MAC) Authentication Bypass (MAB);

receiving onboarding requests from a plurality of client devices on a first personal network of the plurality of personal networks, the first personal network assigned to a first tenant of the plurality of tenants; and processing the onboarding requests in a manner permitting intercommunication among the plurality of client devices, within the first personal network to which the first tenant and no other tenant of the plurality of tenants has access, to take place across the MDU network.

2. The method according to claim 1, wherein the plurality of client devices includes at least one wireless client device.

3. The method according to claim 1, wherein the plurality of client devices includes at least one client device wired to a switch.

4. The method according to claim 1, wherein the plurality of client devices includes at least one wireless client device and at least one client device wired to a switch.

5. The method according to claim 1, wherein the MDU network has one or more Service Set Identifiers (SSIDs) used by client devices of the plurality of tenants to access the MDU network.

6. The method according to claim 1, wherein the MDU network has a common Service Set Identifier (SSID) which must be used by all client devices of all tenants to access the MDU network.

7. The method according to claim 1, wherein an assigned VLAN is accessible to client devices of a corresponding tenant via any of a plurality of access points spread across a multiple dwelling unit (MDU) property.

8. The method according to claim 1, further comprising the step of associating a unique VLAN assigned to a tenant with a Media Access Control (MAC) address of a client device of the tenant.

9. The method according to claim 8, wherein said associating step includes associating the unique VLAN with a plurality of Media Access Control (MAC) addresses of a plurality of client device of the tenant.

10. The method according to claim 1, further comprising the step of providing a tenant portal on which a tenant registers the MAC addresses of their client devices to enable access of an assigned VLAN to the tenant with the registered client devices of the tenant.

11. The method according to claim 10, wherein the tenant portal provides client device usage statistics.

12. The method according to claim 1, further comprising the step of providing a management portal for assisting tenant account creation and tenant on-boarding of client devices.

13. The method according to claim 12, wherein the management portal provides network usage statistics.

14. An apparatus for providing personal networks to tenants on a multiple dwelling unit (MDU) network having a captive portal and a property identification (ID), the property ID is a relationship between a subscriber session controller (SSC) and a wireless access gateway (WAG) infrastructure, the WAG infrastructure including tunnel appliances, the MDU manager configured to provision the SSC using restful API, the MDU comprising an electronic MDU manager that assigns a unique Virtual Local Area Network (VLAN) using dynamic VLAN assignment with Media Access Control (MAC) Authentication Bypass (MAB) to each newly added tenant to thereby define a plurality of personal networks on the MDU network, such that client devices of each tenant are able to use the MDU network only to access the assigned unique VLAN of the tenant, in a manner permitting intercommunication among the client devices of the tenant across the MDU network within the personal network of the tenant.

15. Apparatus according to claim 14, wherein the MDU manager is connected to infrastructure of the MDU network, and wherein the infrastructure includes a plurality of wireless access points and a plurality of switches spread across a multiple dwelling unit (MDU) property such that a personal network of a tenant is accessible to the client devices of the tenant via any of the plurality of access points and switches.

16. Apparatus according to claim 14, wherein the MDU manager is configured to provide a tenant portal permitting a tenant to register a MAC address of a client device to a VLAN assigned to the tenant and a management portal for assisting tenant account creation and tenant on-boarding of client devices, and wherein the MDU manager is configured to provide client device and network usage tracking.

17. Apparatus according to claim 14, wherein said client devices include at least one electronic device selected from the group consisting of a computer, laptop computer, tablet computer, smartphone, gaming device, customer premises equipment, gateway, set top box, television, a wireless client device, and a client device wired to a switch.

18. A non-transitory computer-readable storage medium comprising stored instructions which, when executed by one or more computer processors, cause the one or more computer processors to perform steps of:

assigning Virtual Local Area Networks (VLANs) to a plurality of tenants on a multiple dwelling unit (MDU) network to define a plurality of personal networks on the MDU network such that each of the personal networks is assigned to a different one of the tenants and each of the personal networks is assigned a different VLAN, wherein the VLANs are assigned to the plurality of tenants using dynamic VLAN assignment with Media Access Control (MAC) Authentication Bypass (MAB), the MDU network having a captive portal and a property identification (ID), the property ID is a relationship between a subscriber session controller (SSC) and a wireless access gateway (WAG) infrastructure, the WAG infrastructure including tunnel appliances, the SSC being provisioned using restful API;

receiving onboarding requests from a plurality of client devices for a first personal network of the plurality of personal networks, the first personal network assigned to a first tenant of the plurality of tenants; and processing the onboarding requests in a manner permitting intercommunication among the plurality of client devices, within the first personal network to which the first tenant and no other tenant if the plurality of tenants has access, to take place across the MDU network.

* * * * *